United States Patent
Welch et al.

(10) Patent No.: US 10,410,541 B2
(45) Date of Patent: Sep. 10, 2019

(54) PHYSICAL-VIRTUAL PATIENT BED SYSTEM

(71) Applicants: Gregory Welch, Longwood, FL (US);
Karen Aroian, Rockledge, FL (US);
Steven Talbert, Orange City, FL (US);
Kelly Allred, Orlando, FL (US);
Patricia Weinstein, Maitland, FL (US);
Arjun Nagendran, Orlando, FL (US);
Remo Pillat, Orlando, FL (US)

(72) Inventors: Gregory Welch, Longwood, FL (US);
Karen Aroian, Rockledge, FL (US);
Steven Talbert, Orange City, FL (US);
Kelly Allred, Orlando, FL (US);
Patricia Weinstein, Maitland, FL (US);
Arjun Nagendran, Orlando, FL (US);
Remo Pillat, Orlando, FL (US)

(73) Assignee: University of Florida Research Foundation, Inc., Orlando, FL (US)

( * ) Notice: Subject to any disclaimer, the term of this patent is extended or adjusted under 35 U.S.C. 154(b) by 91 days.

(21) Appl. No.: 15/611,873

(22) Filed: Jun. 2, 2017

(65) Prior Publication Data
US 2017/0337847 A1 Nov. 23, 2017

Related U.S. Application Data

(63) Continuation of application No. 14/206,390, filed on Mar. 12, 2014, now Pat. No. 9,679,500.
(Continued)

(51) Int. Cl.
*G09B 23/30* (2006.01)
*G09F 19/08* (2006.01)
(Continued)

(52) U.S. Cl.
CPC ............ *G09B 23/30* (2013.01); *G03B 21/00* (2013.01); *G03B 21/10* (2013.01); *G03B 21/60* (2013.01);
(Continued)

(58) Field of Classification Search
CPC .......... G09F 19/00; G09F 19/02; G09F 19/08; G09F 2019/086; G09F 2019/088;
(Continued)

(56) References Cited

U.S. PATENT DOCUMENTS 1,653,180 A 12/1927 Georges
2,158,906 A 5/1939 Netter
(Continued)

OTHER PUBLICATIONS

Hrvoje Benko, Andrew D. Wilson, and Ravin Balakrishnan. 2008. Sphere: multi-touch interactions on a spherical display. In Proceedings of the 21st annual ACM symposium on User interface software and technology (UIST '08). ACM, New York, NY, USA, 77-86. DOI: https://doi.org/10.1145/1449715.1449729.*

*Primary Examiner* — Robert P Bullington
(74) *Attorney, Agent, or Firm* — Timothy H. Van Dyke; Beusse, Wolter, Sanks & Maire PLLC (57) ABSTRACT

A patient simulation system for healthcare training is provided. The system includes one or more interchangeable shells comprising a physical anatomical model of at least a portion of a patient's body, the shell adapted to be illuminated from behind to provide one or more dynamic images viewable on the outer surface of the shells; a support system adapted to receive the shells via a mounting system, wherein the system comprises one or more image units adapted to render the one or more dynamic images viewable on the outer surface of the shells; one or more interface devices located about the patient shells to receive input and provide output; and one or more computing units in communication
(Continued)

with the image units and interface devices, the computing units adapted to provide an interactive simulation for healthcare training.

19 Claims, 4 Drawing Sheets

Related U.S. Application Data (60) Provisional application No. 61/792,615, filed on Mar. 15, 2013.

(51) Int. Cl.
| | | |
|---|---|---|
| G09F 19/02 | (2006.01) | |
| G09F 19/00 | (2006.01) | |
| G03B 21/60 | (2014.01) | |
| G03B 21/00 | (2006.01) | |
| G03B 21/10 | (2006.01) | |
| G09B 23/28 | (2006.01) | |
| G09B 23/34 | (2006.01) | |
| G10L 21/10 | (2013.01) | |

(52) U.S. Cl.
CPC ............. *G09B 23/28* (2013.01); *G09B 23/34* (2013.01); *G09F 19/00* (2013.01); *G09F 19/02* (2013.01); *G09F 19/08* (2013.01); *G09F 2019/086* (2013.01); *G09F 2019/088* (2013.01); *G10L 2021/105* (2013.01)

(58) Field of Classification Search
CPC ........ G03B 21/00; G03B 21/10; G03B 21/60; G09B 23/28; G09B 23/288; G09B 23/30; G09B 23/34
USPC .......................................... 434/262, 267, 268
See application file for complete search history.

(56) References Cited

U.S. PATENT DOCUMENTS

| | | |
|---|---|---|
| 3,053,144 A | 9/1962 | Harries |
| 4,076,398 A | 2/1978 | Galbraith |
| 4,104,625 A | 8/1978 | Bristow |
| 4,375,909 A | 3/1983 | Bos |
| 4,978,216 A | 12/1990 | Liljegren |
| 5,221,937 A | 6/1993 | Machtig |
| 5,325,473 A | 6/1994 | Monroe |
| 6,227,864 B1 | 5/2001 | Egelandsdal |
| 6,273,728 B1 | 8/2001 | Van Meurs |
| 6,467,908 B1 | 10/2002 | Mines |
| 7,996,890 B2 | 8/2011 | Sucher |
| 8,256,904 B2 | 9/2012 | Reichow |
| 8,517,543 B2 | 8/2013 | Reichow |
| 8,936,366 B2 | 1/2015 | Papaefstathiou |
| 9,679,500 B2 * | 6/2017 | Welch .................... G09B 23/30 |
| 2012/0045742 A1 | 2/2012 | Meglan |
| 2012/0285978 A1 | 11/2012 | Reichow |
| 2015/0086955 A1 | 3/2015 | Poniatowski |

* cited by examiner

PHYSICAL-VIRTUAL PATIENT BED SYSTEM

CROSS REFERENCE TO RELATED APPLICATIONS

This application is a continuation of U.S. application Ser. No. 14/206,390 filed Mar. 12, 2014 and further claims the benefit of U.S. Provisional Application Ser. No. 61/792,615 filed Mar. 15, 2013, incorporated herein by reference in its entirety.

FIELD OF THE INVENTION

This invention relates to a patient simulator system for healthcare training, and more specifically to a realistic physical-virtual patient simulator bed system for healthcare training.

BACKGROUND OF THE INVENTION

There are presently a number of patient simulator systems for training healthcare personnel, including fully screen-based simulated systems and mannequin systems, including robotic Human Patient Simulators (HPS). In the screen-based systems, a computer-based virtual patient is displayed on a screen. The visual appearance could include 2D computer graphics, 3D graphics, stereo, or head-tracked imagery. However, there is typically no physical interaction with anything resembling a real physical patient. The mannequin-based simulators are typically computer controlled/robotic and can be programmed for a range of responses that simulate a variety of healthcare symptoms and problems. They are able to simulate physical symptoms that can be checked such as heart rate, blood pressure, and simulated breathing. The available simulators range from relatively simple and inexpensive mannequins (a.k.a. "manikins") useful for basic "part task" training, such as that disclosed in U.S. Pat. No. 6,227,864. Other available patient simulator mannequins utilize complex computer controlled systems to provide more realistic environments, as disclosed for example in U.S. Pat. No. 6,273,728. Unfortunately, the mannequin's visual appearance and certain behaviors are often static and unrealistic—there is typically no ability to change such things as the skin color, the skin temperature, the patient race or gender, nor the patient shape/size. Most patient simulators also have no way of sensing the touch (location and force) of the healthcare provider; hence the simulated patient is unable to react to physical contact, neither physiologically nor emotionally.

More realistic mannequins and figures are often used in amusement and theme parks to entertain guests. These devices can use, for example, a film image projected on the face to animate its expression. One technique, known as the front projection technique, involves projecting the film image directly onto the outer surface of the figure's face from a concealed source in front of the face. A second technique, shown in U.S. Pat. Nos. 5,221,937, and 6,467,908, and published Application No. US20120285978, for example, uses back projection that involves projecting the film image, usually by one or more reflectors, onto the back of the figure's face from a remote film source to animate the facial expression of the figure. However, these animated figures do not provide the full functionality and interactivity needed in a healthcare training situation.

Hence, there is a need for a patient simulator for healthcare training that combines both physical and virtual realities in a system that is not only customizable to a large number of scenarios but also realistic to provide complete physiological simulation necessary for proper training.

The present invention is designed to address these needs.

SUMMARY OF THE INVENTION

Broadly speaking, the invention comprises an improved system, method, and computer-readable media for a patient simulator for healthcare training that combines physical and virtual realities, hereinafter referred to as a Physical-Virtual Patient Bed (PVPB) system.

The invention can be implemented in numerous ways, including as a system, a device/apparatus, a method, or a computer readable medium. Several example embodiments of the invention are discussed below.

As a system, an embodiment of the invention includes a translucent or transparent patient shell secured to a patient bed system. The shell has a fully or partially open back side to allow for illumination from behind. The shell may be secured to a rigid frame to allow the frame to be interchangeably mounted to the bed system. The shell is illuminated from below by one or more image projectors in the bed system adapted to render dynamic patient imagery onto the underneath of the shell so that the image appears on the surface of the shell in a realistic manner. One or more computing units including memory and a processor unit communicate with the projectors and other sensory and interactive devices to provide the interactive simulation. Sensory and interactive devices include, but are not limited to, optical touch sensing devices, targeted temperature feedback devices, audio-based tactile sense of pulse devices, and spatial audio components with signal processing device to simulate vital signs. The system further includes interchangeable human shells and parts of human shells representing body parts capable of being secured to and used with the patient bed system without having to change out the expensive and sensitive components that remain fixed in the patient bed system.

In a specific embodiment, a patient simulation system for healthcare training is provided, comprising: a shell of a physical anatomical model of at least a portion of a patient's body, the shell adapted to be illuminated from behind to provide one or more dynamic images viewable on the outer surface of the shell; a bed system adapted to receive the shell via a mounting system, wherein the bed system has one or more image units adapted to render the one or more dynamic images viewable on the outer surface of the shell; one or more interface devices located about the patient shell to receive input and provide output; and one or more computing units in communication with the image units and interface devices, the computing units adapted to provide an interactive simulation for healthcare training.

Further refinements include wherein the shell is at least in part translucent or transparent for illumination from behind by the one or more image units; wherein the shell includes one or more interchangeable human-shaped shells and interchangeable parts of human-shaped shells representing body parts, adapted to be secured via the mounting system to the bed system; wherein an underneath surface of the shell has rear projection screen material to permit better visualization of the one or more dynamic images viewable on the outer surface of the shell; wherein the shell has one or more openings on a back side thereof to allow for unobstructed rendering of the one or more dynamic images by the one or more image units; wherein the shell is an upper longitudinal slice of a prone human figure having a partially or fully open back to allow for unobstructed rendering of the one or more dynamic images by the one or more image units; and wherein the shell has one or more additional separations or flexible portions to allow for movement of the shell on an articulating bed system.

Aspects of the invention further include wherein the one or more image units render dynamic patient imagery from behind onto an underneath of the shell so that the one or more images viewable on the outer surface of the shell simulate viewable conditions including one or more of skin color, skin condition, and facial expressions.

The one or more interface devices may include one or more sensory devices, interactive devices, and output devices, such as one or more optical touch sensing devices, targeted temperature feedback devices, audio-based tactile sense of pulse devices, and spatial audio components with signal processing to simulate vital signs.

In certain embodiments, the bed system includes an upper assembly adapted to resemble a standard hospital bed or gurney, and a lower assembly adapted to house the one or more image units, interface devices, and computing units. The one or more image units include one or more projectors and one or more mirrors coupled to a support in the lower assembly and arranged with proper alignment, registration, and focus, so that a projected image will properly project onto the underneath surface of the shell and show through on the outer surface of the shell. The plurality of projectors may span the portion of the bed system that will be occupied by the shell so that each of the plurality of projectors are positioned to cover a different portion of the shell.

As a method, an embodiment comprises implementing one or more patient simulations using the PVPB system for healthcare training. The method of the present invention may be implemented in conjunction with a computing device and as part of a computer program product with a non-transitory computer-readable medium having code thereon. The computing device may include at least one processor, a memory coupled to the processor, and a program residing in the memory which implements the methods of the present invention.

Aspects of the invention include a method for implementing one or more patient simulations using a patient simulation system having a shell comprising a physical anatomical model of at least a portion of a patient's body and a bed system adapted to receive the shell, the method including: illuminating the shell from behind to provide one or more dynamic images viewable on the outer surface of the shell via one or more image units adapted to render the one or more dynamic images viewable on the outer surface of the shell; interfacing with one or more interface devices located about the patient shell to receive input and provide output as part of the simulation; and providing an interactive simulation for healthcare training via one or more computing units in communication with the image units and interface devices.

The advantages of the invention are numerous, including cost and visual realism. In terms of cost, because of the interchangeability of the shells with the expensive components remaining fixed in the bed system, the system would be relatively inexpensive compared to an HPS. In addition, the system provides very realistic dynamic visual appearances, including "human" patients that can turn and look at you, appear pale or flush, appear to cry, smile, etc., to provide a more realistic experience. The system may be used for a range of civilian and military healthcare training, including physicians, nurses (including for example nurse practitioners), healthcare technicians, emergency healthcare technicians, paramedics, administrative staff, and even hospital volunteers. The conventional HPS does not change visual appearance in any way. It cannot change skin color per certain healthcare conditions, cannot simulate wounds graphically under computer control, cannot appear to change gender or race, cannot exhibit live facial expressions (e.g., smile, frown, or look frightened), and cannot move or give the appearance of moving body parts such as heads or limbs. Advantageously, the system herein realistically simulates a human patient in a hospital bed in a way that supports changing appearance (e.g., race and various healthcare symptoms), alterable size (e.g., child or adult), certain physiological signals, along with apparent or actual motion of body parts.

Accordingly, aspects of the present invention provide for simulation of a human patient in a hospital bed in a way that supports changing appearance (e.g., race and various healthcare symptoms), alterable size (e.g., child or adult), some physiological signals, along with apparent or actual motion of body parts.

Other aspects and advantages of the invention will become apparent from the following detailed description taken in conjunction with the accompanying drawings, illustrating, by way of example, the principles of the invention.

All patents, patent applications, provisional applications, and publications referred to or cited herein, or from which a claim for benefit of priority has been made, are incorporated herein by reference in their entirety to the extent they are not inconsistent with the explicit teachings of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof, which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Referring now to the drawings, the preferred embodiment of the present invention will be described.

Figure 1:
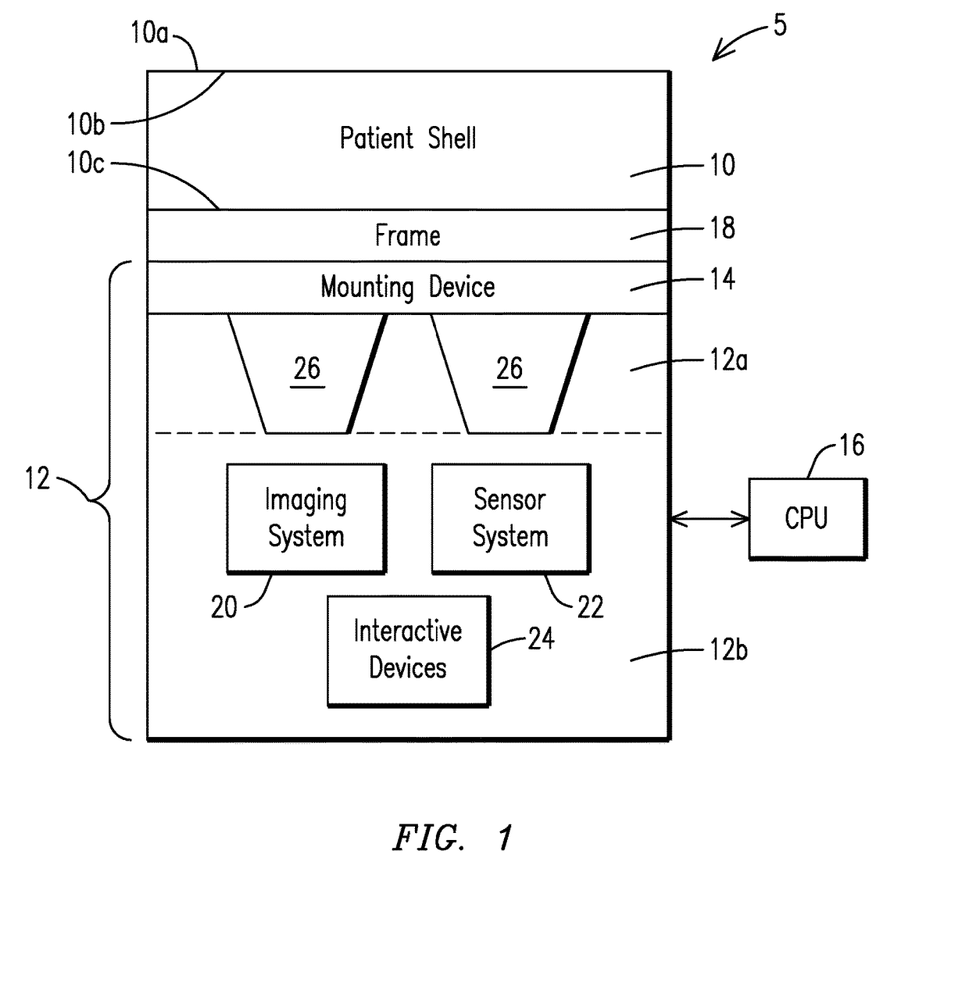
FIG. 1 is a block diagram of an embodiment of the invention.

FIG. 1 shows a block diagram of the patient simulator 5 for healthcare training hereinafter referred to as the Physical-Virtual Patient Bed (PVPB) system. The PVPB system 5 includes a translucent or transparent patient shell 10 secured to a patient bed system 12. The shell 10 is illuminated from below by one or more image projectors 20 in the bed system 12 adapted to render dynamic patient imagery onto the underneath of the shell 10 so that the image appears on the surface of the shell 10 in a realistic manner. One or more computing units 16 including memory and a processor unit communicate with the projectors 20 and other sensory devices 22 and interactive devices 24 to provide the interactive simulation. Sensory devices 22 and interactive devices 24 include, but are not limited to, optical touch sensing devices, targeted temperature feedback devices, audio-based tactile sense of pulse devices, and spatial audio components with signal processing device to simulate vital signs. The PVPB system 5 further includes interchangeable human shells 10 and parts of human shells representing body parts capable of being secured via a mounting device 14 to the patient bed system 12 without having to change out the expensive and sensitive components (20, 22, 24) that remain fixed in the patient bed system 12.

The patient simulator 5 combines physical (e.g., patient shell) and virtual (e.g., imaging, sensory) realities. The PVPB system 5 preferably uses a real (or realistic) hospital bed 12, modified to include a prone human-shaped mannequin in the form of a shell 10, such as a vacuform (vacuum formed material) patient "shell" that is illuminated from below by one or more image projectors 20 (e.g. digital projectors) that render dynamic patient imagery onto the rear (underneath) of the shell 10. The effect is that nearby humans (e.g., nurses in training, students) can see a dynamic physical-virtual "patient" lying in bed, where the imaging system provides for the patient to exhibit lifelike facial expressions (while talking, etc.), lifelike skin color (e.g., to convey race or symptoms), realistic wounds, etc. Projectors 20, when mounted as a rear projection system, allow for materials such as blankets, clothing-like coverings, and various healthcare components or devices to be placed over the physical-virtual patient in the bed 12 and to not interfere with the projected images.

To add to the interactivity and enhance healthcare training simulation, further embodiments of the PVPB system also include touch sensing (e.g., from hands or medical devices) via a sensor system 22 for the "skin" (e.g., via various optical approaches), and skin temperature control (e.g., via temperature-controlled air streams directed to the underside of the shell) via interactive devices 24. Further interactive devices 24, such as audio or other active sources (e.g., via speakers under the bed, pointing up toward the shell) may be used to add audible or tactile signals such as a heartbeat or pulse.

The interactive devices 24, such as targeted temperature feedback devices, audio-based tactile sense of pulse devices, and spatial audio components with signal processing device may be provided to simulate vital signs. The targeted temperature feedback over the surface of the body provides numerous advantages. The temperature-controlled forced air in select areas of a rear-projection surface, e.g., a human body, uniquely conveys temperature information to users. From a healthcare standpoint (as an example) skin temperature, when combined with visual appearance and behavior, can be an important symptom of shock or fever. The audio-based tactile sense of pulse uniquely uses multiple surface-mounted acoustic emitters (speakers or similar transducers) and associated signal processing to provide a tactile sense of movement at a "phantom" location (a location other than the emitters). This method may be used to simulate the feeling of a pulse in the wrist or neck, for example, without the need for transducers mounted at the exact point of the tactile sense. The separately-mounted spatial audio components and signal processing are uniquely used to provide a sense of a sound emanating from "within" a rear-projection surface, when sensed on the surface. This feature may be used, for example, to simulate a heartbeat and breathing emanating from within the body, heard through a stethoscope placed on the surface of the body (the rear-projection human form/shell). The technique may be used to simulate anomalies such as labored breathing, pneumonia, or heart anomalies (e.g., a valve prolapse).

The shell 10 may be comprised of variations of shapes of humans, or non-human shapes, to accommodate "synthetic animatronics"—the appearance of multiple and/or changing postures such as head (e.g., turning the head), or limbs (e.g., rotating the hand/arm). Because the image projectors 20 are located in the bed system 12 underneath the shell 10, a variety of shells 10 may be provided to allow for a wide range of patient simulators 5 without the increased cost and complexity of having imaging projectors 20 and electronics (e.g., sensor system 22, interactive devices 24, CPU 16) in each simulator. To that end, a variety of such patient shells 10 may be substituted/exchanged on the bed system 12, to allow, for example, different sized humans (e.g., thin or heavy, adult or child) or missing limbs (e.g., from an accident or amputation). This substitution may be accomplished, for example, by mounting via a suitable mounting device 14 the patient shells 10 in uniformly sized rigid frames that can be locked into place in the bed 10. Other suitable mounting devices 14 are also contemplated herein, such as brackets, fasteners, coupling members that allow for securely mounting and interchanging the patient shells 10. The rear-projection human form uniquely employs interchangeable human bodies and body parts. This feature will accommodate different genders, ages, and healthcare conditions. Examples include a child (small body), an obese person, and an amputee. Among other advantages, this approach offers a lightweight and simple (no attached electronics) approach to rapidly changing the simulated physical-virtual patient. The human shell forms themselves can be relatively inexpensive and robust. The expensive and sensitive components remain fixed under the bed system.

Other combinations/variations of imaging systems and techniques, used in lieu of or in addition to the imaging system 20 include the use of Shader Lamps—front (top) projection onto a static mannequin, the use of flexible displays (e.g., OLED), and the like, especially in retrofit situations. For example, front/top projection onto a robotic Human Patient Simulator (HPS) would add to the complete physiological simulation afforded by typical HPS units. Other retrofit techniques may be used to support synthetic animatronics, skin temperature changes, or touch sensing.

In an example embodiment, the shell 10 is made to serve as a rear projection screen in the form of a 3D figure of a human. The shell 10 may be molded from a translucent moldable material, such as plastic. In accordance with an embodiment, shell 10 comprises vacuformable material. A number of suitable vacuformable materials may be chosen such as acrylic, butyrate, and PETG (glycol-modified polyethylene terephthalate) which is a copolyester that may be a clear amorphous thermoplastic. The underneath surface 10b of the shell 10 may be coated with a rear projection screen material to permit better visualization of the image through to the top surface 10a projected by imaging system 20, and/or better optical sensing of touch through to the top surface 10a via the sensor system 22.

One or more openings may be provided on the back 10c of the shell 10 to allow for better projection of images by the imaging system 20 in the bed system 12 onto the underneath surface 10b. Alternatively, part, most, or the entire back side 10c of the shell 10 may be removed, such that the shell 10 comprises only an upper slice (e.g., approximately ½) of a prone human figure having a partially or fully open back 10c. The edge of the open back 10c of the shell 10 may be secured to a frame 18 or other rigid support device, so that the frame 18 can then be easily, securely, and interchangeably mounted to a corresponding mounting device 14 of the bed system 12.

Figure 2:
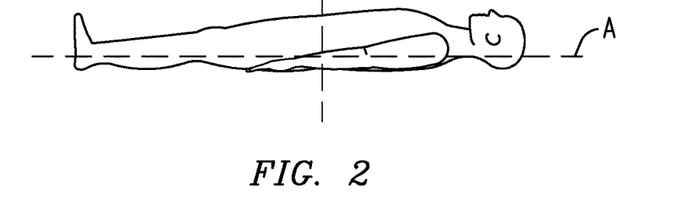
FIG. 2 is an illustration of a shell of an embodiment of the invention.

For example, a human shaped vacuform "shell" 10 can be obtained from a provider who produces special effects for theme parks, museums, trade shows and special events (e.g., PeopleVisionFX of Roselle, N.J.). In order to better provide for imaging and interactivity, the vacuform "shell" 10 may be sliced from head to toe longitudinally (line A of FIG. 2) opening the back side 10c to allow projection of the images through the opening, as shown in FIG. 2. It may also be separated at the waist (line B of FIG. 2) to allow for movement (e.g., bending at the waist) or other separations may be provided for movement of other body parts. The shell 10 with the cut-away back side 10c may then be mounted on a frame 18 or similar device that can be secured into place on the bed system 12. Proper mounting and placement of the shell 10 with respect to the bed system 12 and imaging system 20 comprise proper alignment, registration, and focus of the projected image onto the underneath surface 10b of the shell 10. Alignment and registration marks may be provided on the shell or as part of the frame 18 and/or mounting system 14.

The projectors 20 (e.g., digital projectors) that render dynamic patient imagery onto the underneath 10b of the shell 10 are designed and properly placed to project through the open back 10c of the shell 10. The projectors 20 may be placed in respective/corresponding openings 26 in the upper 12a and lower 12b bed mattress support areas. The sliced shell 10 may be mounted rigidly to a rectangular or similarly shaped frame 18 that that will mate with (attach to) a corresponding mounting device (e.g., frame) 14 on the bed system 12. The frame 14 may include a rigid "fill" material (e.g., plastic) that extends from the frame 14 to the shell 10.

In an example embodiment (see FIG. 3), the bed system 12 includes an upper assembly 12a and a lower assembly 12b. The upper assembly 12a may resemble a standard hospital bed or gurney. The lower assembly houses the electronics (e.g., imaging system 20, sensor system 22, and interactive devices 24). It may be specifically manufactured or retrofitted from a standard hospital bed (e.g., a Pocket Nurse® Full Electric Hospital Bed, of Monaca, Pa.). In certain embodiments, the hospital bed can be modified to allow only one point of articulation at/across the "waist" with all other articulation restricted mechanically. Height adjustment may be maintained/allowed. When retrofitting, the mattress support area in the upper assembly 12a is cut/modified to provide one or more openings 26 through which the imaging system 20 can project imagery from below onto the underside 10b of the shell 10. Opening(s) 26 are placed and sized to properly project the imagery from the imaging system 20 through the mounting device 14 onto the underneath 10b of the shell 10. The opening(s) 26 cut in support area may be placed and sized to mate with the frame 18 of the shell 10 using a corresponding frame or similar mount 14.

Figure 3:
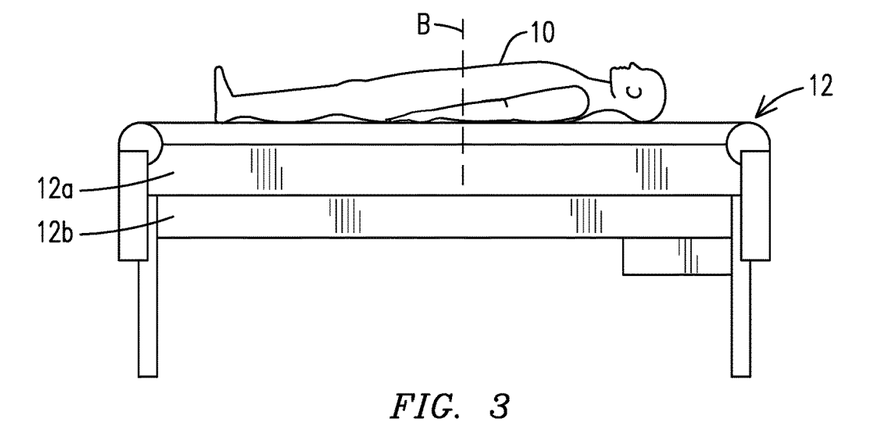
FIG. 3 is an illustration of a bed system of an embodiment of the invention.

The lower assembly 12b is designed to support and house the electronics (e.g., imaging system 20, sensor system 22, interactive devices 24, CPU 16). In an embodiment, a platform such as a strong horizontal "shelf" or other mounting structure may be rigidly affixed to the upper and lower bed portions, mounted to the underside of the bed. The chosen support arrangement may allow for lateral, horizontal and vertical adjustments of the electronics. For flexibility and customization, the platform may be in the form of an "optical breadboard" (metal "pegboard") such as those manufactured by Thorlabs Inc. of Newton, N.J., that will permit repositioning of electronics, projectors, cameras, mirrors, etc. Rigid, passive, or active vibration damping may also be provided. The design may accommodate folded optics arrangement with projectors and cameras below so they can be mounted horizontally on the optical breadboard, and the imagery can be reflected to the underside of the vacuform shell 10.

Alternatively, the design may include "sleds" (mounting units) for projectors, cameras, and mirrors so that they can be moved around on the optical breadboard, and clamped down when in place. Sleds for projectors may provide a mechanism to mount wide angle adapters for projectors (such as wide-angle conversion lens that fit in front of the projector's standard lens allowing a projection image that is 50% larger than the projector's standard lens at the same distance (e.g., the SSC065 Mini ScreenStar Wide Angle Converter (0.65×) by Navitar, Inc. Rochester, N.Y.). Adjustability of the optical sleds (mirrors, cameras, projectors) may include one or more of the following: translate in 2D on the optical breadboard, rotate about an axis coming out of the breadboard perpendicular, tilt up and down out of the plane of the breadboard. COTS sleds/mounts may be used for mirrors.

The imaging system 20 provides the virtual effects for a more realistic experience. A wide variety of projectors may be used to obtain these effects. The imaging may be aligned, registered, stabilized, and controlled using image processing software in a controller or CPU 16 in communication with the imaging system 20. Computer generated graphics may be used to create one or more images for projection. A media controller (separate from or part of CPU 16) may be operable to control media supplied to the imaging system 20 via communication means (e.g., wired/wireless) and therefore projection of a particular image/image stream. Media may be retrieved from a plurality of stored and/or dynamically generated media, suitable for the particular training exercise.

The imaging system 20 comprises one or more projectors coupled to a support platform (via breadboard) in the lower assembly 12b. The platform provides a rigid support such that once the shell 10 and projector(s) of the imaging system 20 are arranged with proper alignment, registration, and focus, and the optical components are sufficiently calibrated (e.g., the geometric and photometric parameters), the projected image will properly project onto the underneath surface 10b of the shell 10 and show through on to the top surface 10a of the shell 10. An example projector includes the AAXA M2 micro projector from AAXA Technologies of Tustin, Calif., which can be used with an adapter (e.g., a Vivitar adapter) for WFOV (Wide Field Of View). LED projectors may be chosen for reliability, consistency, short throw, non-critical resolution, lighting, etc. Since the human shell 10 can have different images projected on different parts thereof, a plurality of projectors may be used. The projectors can be arranged to have projector overlap on the "shell" surface (which may be minimal).

For the purpose of touch sensing for the simulator, the sensor system 22 may provide for camera-based optical touch technology to detect the presence of a touching object, including traditional infrared, waveguide infrared, vision-based, LCD In-cell Optical, or the like. The term "camera" is used in optical touch to designate an assembly that typically includes a housing, image sensor, cable, lens, and IR filter. Depending on the system architecture, a camera may also include an IR light source (for retro-reflective systems) and an image processor. Advantages of certain features include this body-specific optical touch sensing over the entire human body form and its unusual topology. Specifically the system employs novel multiple overlapping infrared light sources and image forming cameras to cover and decode touch over a non-parametric surface, with shape discontinuities and occlusions, such as occurs with a touch surface in the shape of the human body.

For example, in an embodiment, the camera units may be mounted in the bed system 12, with distinct optical paths from the projectors (e.g., folded optical paths). Each camera unit may comprise a pair of cameras arranged with a cold mirror such that JR light only is passed to one camera (e.g., used for touch sensing), and visible light (only) is passed to the other camera (e.g., used for calibration of the visible projector imagery), where the latter may use an IR cut filter on the camera. Mirrors may be used for folding projector and (if desired) camera unit optical paths. The camera arrangement may use COTS mirror units that already mate with the optical breadboard, and accommodate different sized mirrors. The underside of the bed may include a form of IR illumination source to illuminate (IR) the underneath 10a of the human shell 10 for the purpose of touch sensing of the sensor system 22. An example of touch sensing using a spherical display prototype that has touch-sensing capabilities with an infrared camera that shares the optical path with the projector without shadowing or occlusion problems is described in "Sphere: A Multi-Touch Interactive Spherical Display" by Benko, Wilson and Balakrishnan, incorporated herein by reference. The IR light would preferably emanate from near the cameras (or a comparable optical path, so that reflected light returns to the camera), cover the area imaged by the camera, and be sufficiently bright to illuminate close objects on the opposite side—the outside/top/upper part 10a of the shell 10. For example, IR ring lights may be used provided the distance/range is sufficient.

The invention provides a novel overall systems/methods for training healthcare professionals that combines the visual and physical shape to afford dynamic visual patient appearance (e.g., behavior, emotion, symptoms or pathology); body-specific optical touch sensing over the entire human body form and its unusual topology; interchangeable human bodies and body parts to accommodate, for example, different genders, ages, and healthcare conditions; targeted temperature feedback over the surface of the body; a tactile sense of pulse; and aural senses of a heartbeat and breathing (including anomalies for both).

The following is an example PVPB system 5, with reference to FIGS. 4-10. The dimensions used herein are examples only. The actual dimensions would be adjusted to accommodate the actual components and shell size.

Example Projector Specifications: Aaxa M2 Projector. Measurements (W×D×H): 132×125×47 mm. At 68.5" distance, image was 34" wide and 26" tall (without conversion lens). At 68.5" distance, image was 50" wide and 38" tall (with conversion lens). Throw Ratio:

$$R = \frac{d}{w} = \frac{1}{2\tan\left(\frac{a}{2}\right)}$$

where α is the horizontal/vertical projection angle, d is the distance from the projector to the surface, and w is the width or height. There can be a vertical offset, so the bottom of the projected images lines up with center of lens.

Example Camera Specifications: Basler Ace acA2000-50 gc. Measurements (W×D×H): 29×42×29 mm. 2048×1088 pixel @ 50 fps. Gigabit Ethernet interface with PoE. Interchangeable C-mount lenses should support a variety of mounting distances.

Figure 4:
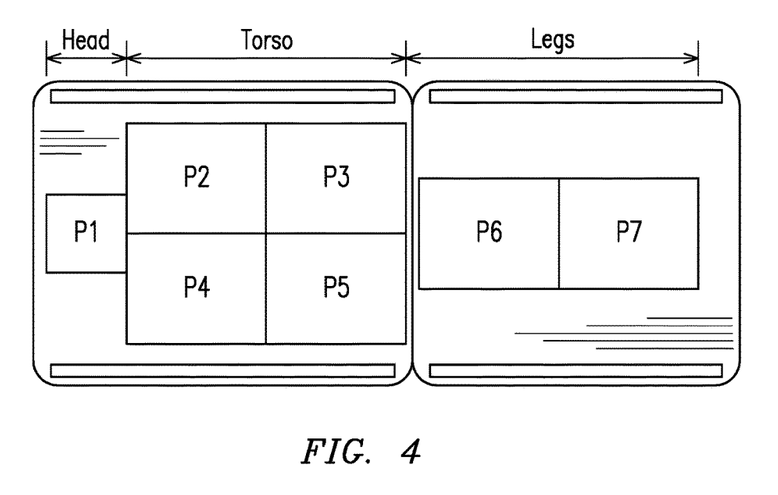
FIG. 4 shows a top-view sample layout of the placement of the projectors of the imaging system of an embodiment of the invention.
Figure 5:
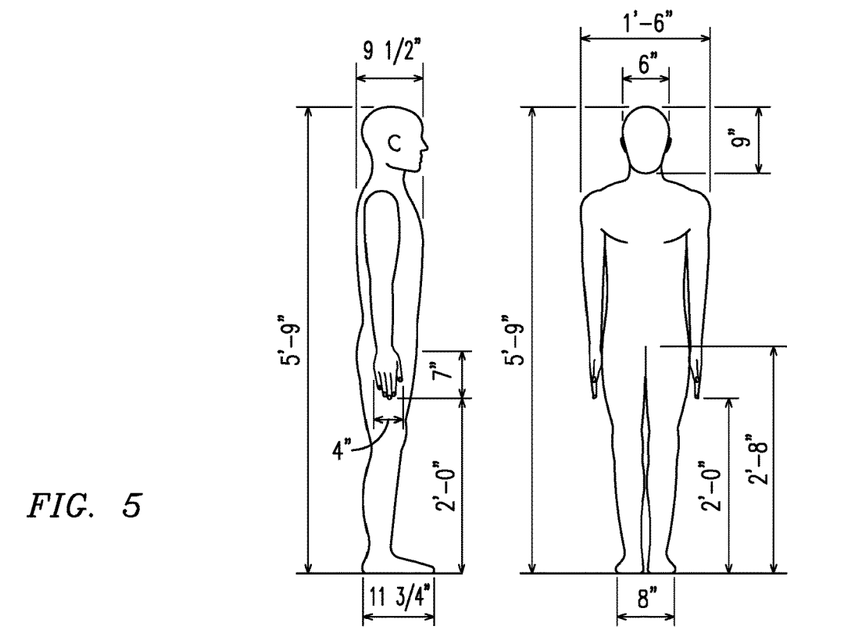
FIG. 5 shows an illustration of example torso dimensions.

Example Projector Placement and Configuration: FIG. 4 shows a rough layout, in the top-view, of the proposed placement. In this example, seven projectors (P1 to P7) span the portion of the bed surface that will be occupied by the patient "shell" 10. Specifically, P1 covers the head, P2 through p5 cover the torso, and P6, P7 cover the legs. Since the bed 'articulates,' projectors P1 through P5 are mounted accordingly so they remain 'static' with respect to the articulated top half of the bed. In order to achieve the above-mentioned design, two different configurations are contemplated. The design is divided into 'Torso' and 'Legs' for convenience. The 'head' design is not highlighted herein, but may be very similar to those proposed for legs or torso.

Example Torso with Average Human Measurements: (See FIG. 5) Shoulder width: approximately 18"=457.2 mm; Chest height (above mattress): approximately 4.5"=114.3 mm; Torso height: approximately 30"=762 mm. For a design with 4 projectors covering the complete torso, horizontal image width at the torso is approximately 15"=381 mm; vertical image height is approximately 11.28"=286.5 mm.

Figure 6:
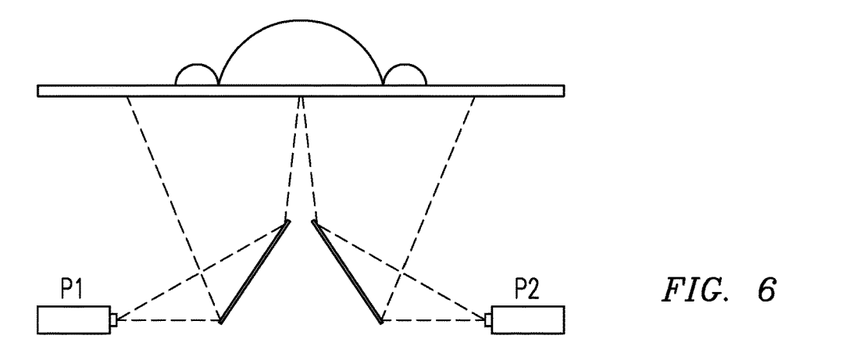
FIG. 6 shows a first design example design for Torso Projection having a Single Mirror Path Folding.

FIG. 6 shows a first design example design for Torso Projection having a Single Mirror Path Folding (Design 1). The throw ratio of the projectors makes it difficult to achieve a direct projection without dropping them well beneath the surface of the bed. As a result, it was decided to use mirrors to fold the path of the projection, thereby allowing us to mount the projectors closer to the bed surface. FIG. 6 shows an example 'to-scale' version of the projection. The projectors are mounted horizontally facing inward under the outer edges of the bed, with mirrors on the inside to achieve the desired projection as shown. The measurements are shown in the following table:

TABLE 1

| | Single Mirror Path Folding (Design 1) | | | |
|---|---|---|---|---|
| Projector Pair | Projector height (from base of bed surface) | Mirror Distance (from projector) | Mirror Dimension (length) | Mirror Angle |
| 1 (P4, P5) | 420.5 mm (16.5") | 250 mm (9.84") | 217.7 mm (8.54") | 56° |
| 2 (P2, P3) | 420.5 mm (16.5") | 250 mm (9.84") | 210.5 mm (8.28") | −56° |

Figure 7:
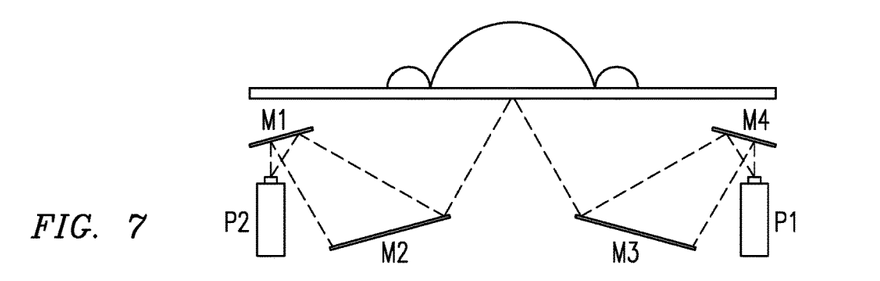
FIG. 7 shows a second design example design for Torso Projection having a Dual Mirror Path Folding.

FIG. 7 shows a second design example design for Torso Projection having a Dual Mirror Path Folding. This design involves the use of two mirrors to fold the path of the projection, thereby allowing mounting of the projectors even closer to the bed surface. FIG. 7 shows an example 'to-scale' version of the projection. The projectors are vertically facing upward mounted under the outer-edges of the bed, with mirrors as shown to achieve the desired projection as shown. The measurements are shown in the following table:

TABLE 2

Dual Mirror Path Folding (Design 2)

| Projector Pair | Projector height (from base of bed surface) | Mirror Distance (from projector) | Mirror Dimensions (length) | Mirror Angle |
|---|---|---|---|---|
| 1 (P4, P5) | 282.5 mm (11.1") | M1: 76 mm (2.99") | M1: 112.5 mm (4.42") | M1: 16° |
|  |  |  | M2: 223.5 mm (8.79") | M2: 16° |
| 2 (P2, P3) | 282.5 mm (11.1") | M3: 76 mm (2.99") | M3: 112.5 mm (4.42") | M3: −16° |
|  |  |  | M4: 215.9 mm (8.5") | M4: −16° |

Figure 8:
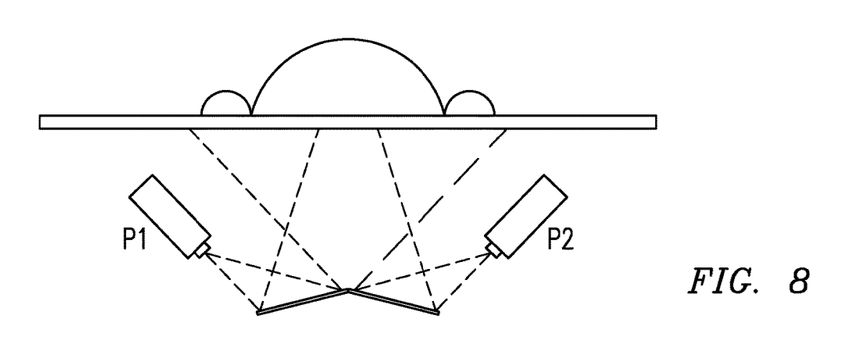
FIG. 8 shows a third design example for Torso Projection having a Single Mirror Crossfire Configuration.

FIG. 8 shows a third design example for Torso Projection having a Single Mirror Crossfire Configuration. This design uses the projectors in a "cross-fire" configuration, i.e. each projector illuminates the torso side that is laterally opposite to the projector's mounting position. FIG. 8 shows an example 'to-scale' version of the projection. This placement leaves a greater buffer zone from the projectors to the edge of the bed, potentially allowing a future placement of the patient shell closer to one side of the bed. The measurements are shown in the following table:

TABLE 3

Single Mirror Crossfire Configuration (Design 3)

| Projector Pair | Projector height (from base of bed surface) | Mirror Distance (from projector) | Mirror Dimensions (length) | Mirror Angle |
|---|---|---|---|---|
| 1 (P4, P5) | 284.8 mm (11.21") | 163 mm (6.42") | 137.1 mm (5.4") | 14° |
| 2 (P2, P3) | 284.8 mm (11.21") | 163 mm (6.42") | 133 mm (5.24") | −14° |

Figure 9:
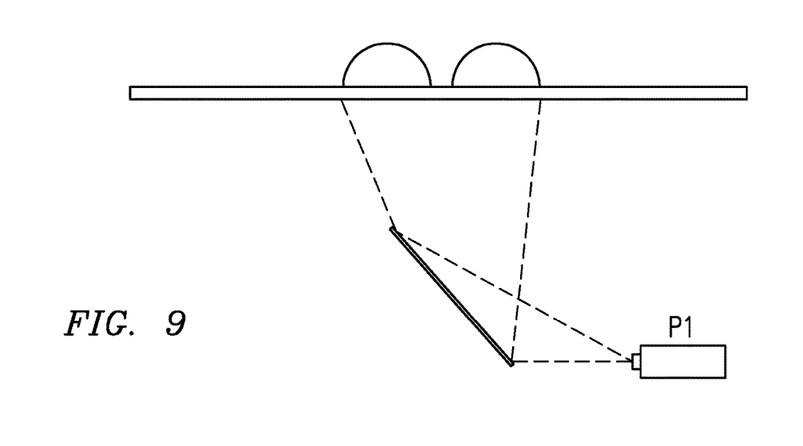
FIG. 9 shows a first design example for Legs Projection having Single Mirror Path Folding.
Figure 10:
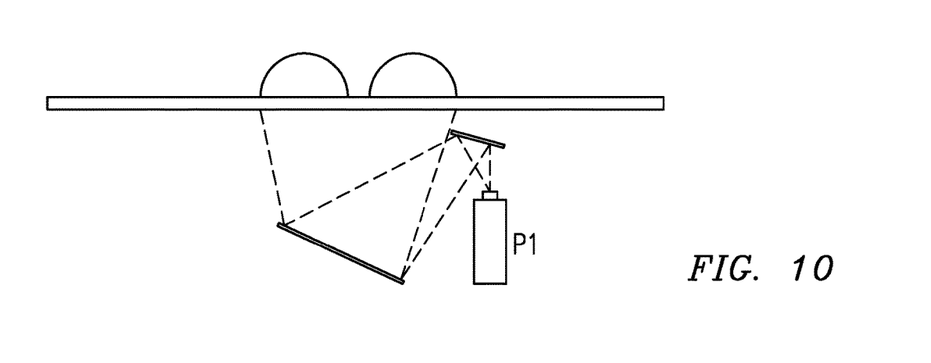
FIG. 10 shows a second design example for Legs Projection having Dual Mirror Path Folding.

FIG. 9 shows a first design example for Legs Projection having Single Mirror Path Folding. FIG. 10 shows a second design example for Legs Projection having Dual Mirror Path Folding. Two projectors may be used to cover the legs. The vertical image width at the torso may be about 12"~=300 mm; the horizontal image height may be about 15""~=392 mm. The same designs as those used for the torso can be used here.

Example Camera Unit and IR Illumination Placement and Configuration: The exact placement of the cameras (camera units) and associated cold mirrors, IR illumination, etc. may be determined based on the chosen shell and projector configuration. The following are two possibilities in regards to camera placement: (1) Placing them in-line with the projectors, looking into the mirrors at the projected image. This would use 7 cameras. (2) Mount them between the mirrors looking upwards. The placement of the mirrors may take the desired camera positions into account in order to not obstruct their view. Generally, the whole body could be covered by 3 cameras. To quantify the required lens focal lengths, the best and worst case can be considered for covering the complete torso with one upward-facing camera (possibility 2). Smaller focal lengths of the lens will increase the magnitude of non-linear distortions towards the edges of the image. This may result in a reduced peripheral resolution and more complicated calibration procedures. The following table lists the focal lengths for the lenses and possible models that fulfill these requirements

TABLE 4

Camera Unit Placement:

| Mounting Distance | Desired image width/height at distance | Required Lens Focal Length | Lens Model |
|---|---|---|---|
| 282.5 mm (11.02") | 762 × 457.2 mm | 3.24 mm | Fujinon FE185C086HA 2.7 mm F/1.8 |
| 420.3 mm (16.55") | 762 × 457.2 mm | 4.85 mm | Pentax C30405KP 4.8 mm F/1.8 |

An exemplary system for implementing the invention includes a computing device or a network of computing devices. In a basic configuration, computing device may include any type of stationary computing device or a mobile computing device. Computing device typically includes at least one processing unit and system memory. Computing device may also have input device(s) such as a keyboard, mouse, pen, voice input device, touch input device, etc. Output device(s) such as a display, speakers, printer, etc. may also be included. A computing device also contains communication connection(s) that allow the device to communicate with other computing devices and the PVPB system, for example over a network or a wireless network.

It should be understood that the examples and embodiments described herein are for illustrative purposes only and that various modifications or changes in light thereof will be suggested to persons skilled in the art and are to be included within the spirit and purview of this application.

We claim:

1. A patient simulation system for healthcare training, comprising:
   a shell comprising a physical anatomical model of at least a portion of a patient's body, the shell adapted to be illuminated from behind to provide one or more dynamic images viewable on the outer surface of the shell, but allow transfer of IR light to detect objects on the outside surface of the shell;
   a support system adapted to receive the shell via a mounting system, wherein the support system comprises one or more image units adapted to render the one or more dynamic images viewable on the outer surface of the shell;
   one or more interface devices comprising one or more optical touch sensing devices located underneath the patient shell to receive input and provide output, wherein the one or more optical touch sensing devices comprise multiple IR cameras that are positioned to detect an object on the outside surface anywhere along the entire shell; and
   one or more computing units in communication with the image units and interface devices, the computing units adapted to provide an interactive simulation for healthcare training;
   wherein the support system comprises an upper assembly adapted to resemble a standard hospital bed or gurney, and a lower assembly adapted to house the one or more image units, the one or more interface devices, and computing units; and
   wherein the multiple cameras overlap to cover and decode touch over a non-parametric surface.

2. The patient simulation system of claim 1, wherein the shell is at least in part translucent or transparent for illumination from behind by the one or more image units.

3. The patient simulation system of claim 1, wherein the shell comprises one or more interchangeable human-shaped shells and interchangeable parts of human-shaped shells representing body parts, adapted to be secured via the mounting system to the support system.

4. The patient simulation system of claim 1, wherein an underneath surface of the shell comprises rear projection screen material to permit better visualization of the one or more dynamic images viewable on the outer surface of the shell.

5. The patient simulation system of claim 1, wherein the shell comprises one or more openings on a back side thereof to allow for unobstructed rendering of the one or more dynamic images by the one or more image units.

6. The patient simulation system of claim 1, wherein the shell comprises one or more upper longitudinal slices of a prone human figure having a partially or fully open back to allow for unobstructed rendering of the one or more dynamic images by the one or more image units.

7. The patient simulation system of claim 1, wherein the shell comprises one or more additional separations or flexible portions to allow for movement of the shell via an articulating support system appropriate for the body and posture.

8. The patient simulation system of claim 2, wherein the one or more image units render dynamic patient imagery from behind onto an underneath of the shell so that the one or more images viewable on the outer surface of the shell simulate viewable conditions including one or more of skin color, skin condition, and facial expressions.

9. The patient simulation system of claim 1, wherein the one or more interface devices further comprise one or more interactive devices, and output devices that simulate a physiological output.

10. The patient simulation system of claim 9, wherein the one or more interface devices comprise the one or more optical touch sensing devices, targeted temperature feedback devices, audio-based tactile sense of pulse devices, and spatial audio components with signal processing to simulate vital signs.

11. The patient simulation system of claim 1, wherein the one or more image units comprise one or more projectors and one or more mirrors coupled to a support in the lower assembly and arranged with proper alignment, registration, and focus, so that a projected image will properly project onto the underneath surface of the shell and show through on to the outer surface of the shell.

12. The patient simulation system of claim 11, wherein a plurality of projectors span the portion of the support system that will be occupied by the shell and wherein each of the plurality of projectors are positioned to cover a different portion of the shell.

13. The patient simulation system of claim 11, wherein a plurality of projectors are adapted for a torso projection having a single mirror path folding wherein the projectors are mounted horizontally facing inward under outer edges of the support system, with one mirror for each projector on the inside to achieve a desired projection.

14. The patient simulation system of claim 11, wherein a plurality of projectors are adapted for a torso projection having a dual mirror path folding wherein the projectors are mounted vertically facing upward under outer edges of the support system, with two mirrors for each projector to achieve a desired projection.

15. The patient simulation system of claim 11, wherein a plurality of projectors are adapted for a torso projection having a single mirror crossfire configuration wherein each projector illuminates a torso side that is laterally opposite to a mounting position of the projector to achieve a desired projection.

16. The patient simulation system of claim 11, wherein at least one projector is adapted for a legs projection having single mirror path folding, wherein the projector is mounted horizontally facing inward under an outer edge of the support system, with a mirror for the projector on the inside to achieve a desired projection; or the at least one projector is adapted for a legs projection having dual mirror path folding, wherein the projector is mounted vertically facing upward under an outer edge of the support system, with two mirrors for the projector to achieve a desired projection.

17. The patient simulation system of claim 11, wherein camera units adapted for camera-based optical touch technology having infrared light to cover the area imaged by the camera are placed in-line with the projectors, looking into the mirrors at the projected image, to allow for optical touch sensing over the entire shell.

18. The patient simulation system of claim 11, wherein camera units adapted for camera-based optical touch technology having infrared light to cover the area imaged by the camera are placed between the mirrors looking upwards, to allow for optical touch sensing over the entire shell.

19. A method for implementing one or more patient simulations using a patient simulation system having a shell comprising a physical anatomical model of at least a portion of a patient's body and a support system adapted to receive the shell, the method comprising:
   illuminating the shell from behind to provide one or more dynamic images viewable on the outer surface of the shell via one or more image units adapted to render the one or more dynamic images viewable on the outer surface of the shell;
   interfacing with one or more interface devices including multiple IR cameras located underneath the patient shell to receive input and provide output as part of the simulation, wherein the multiple cameras overlap to cover and decode touch over a non-parametric surface; and
   providing an interactive simulation for healthcare training via one or more computing units in communication with the image units and interface devices.

* * * * *

UNITED STATES PATENT AND TRADEMARK OFFICE
CERTIFICATE OF CORRECTION

PATENT NO.           : 10,410,541 B2
APPLICATION NO.      : 15/611873
DATED                : September 10, 2019
INVENTOR(S)          : Gregory Welch et al.

Page 1 of 1

It is certified that error appears in the above-identified patent and that said Letters Patent is hereby corrected as shown below:

In the Specification

On Column 1, Line 12, please add the following paragraph before the paragraph titled "FIELD OF THE INVENTION":
--GOVERNMENT SUPPORT
This invention was made with government support under contract/grant no. N00014-12-1-0052 awarded by Office of Naval Research. The government has certain rights in the invention.--

Signed and Sealed this
Twenty-sixth Day of November, 2019

Andrei Iancu
*Director of the United States Patent and Trademark Office*